United States Patent

Machimura et al.

Patent Number: 5,840,792
Date of Patent: Nov. 24, 1998

[54] LITHIUM, ALUMINUM, MAGNESIUM/ZINC HYDROXIDE SALT

[75] Inventors: Hitoshi Machimura; Akiko Taniguchi; Tatsuo Murakami, all of Toyama, Japan

[73] Assignee: Fuji Chemical Industry Co., Ltd., Japan

[21] Appl. No.: 737,276

[22] PCT Filed: Mar. 8, 1996

[86] PCT No.: PCT/JP96/00569

§ 371 Date: Nov. 8, 1996

§ 102(e) Date: Nov. 8, 1996

[87] PCT Pub. No.: WO96/28508

PCT Pub. Date: Sep. 19, 1996

[30] Foreign Application Priority Data

Mar. 10, 1995 [JP] Japan ................................. 7-079526
Mar. 5, 1996 [JP] Japan ................................. 8-075357

[51] Int. Cl.⁶ ................................. C01F 7/16; C08K 3/10
[52] U.S. Cl. ...................... 524/417; 423/274; 423/420.2; 423/463; 423/600; 524/424; 524/434; 524/436
[58] Field of Search ............... 423/274, 420.2, 423/463, 600; 524/417, 424, 436, 434

[56] References Cited

U.S. PATENT DOCUMENTS 5,232,627 8/1993 Burba et al. ................. 423/328.2

FOREIGN PATENT DOCUMENTS

| 5-179052 | 7/1993 | Japan . |
| 5-247297 | 9/1993 | Japan . |
| 6-248109 | 9/1994 | Japan . |
| 7-300313 | 11/1995 | Japan . |
| 8-41076 | 2/1996 | Japan . |

*Primary Examiner*—Veronica P. Hoke
*Attorney, Agent, or Firm*—Harold L. Novick; Nath & Associates

[57] ABSTRACT

There is incorporated as a stabilizer into a halogen-containing resin a complex hydroxide salt represented by the formula $$[Al_2(Li_{(1-x)}\cdot M_x)(OH)_6]_n(A^{-n})_{1+x}\cdot mH_2O$$

wherein A is an inorganic or organic anion, M is Mg and/or Zn, n is a valence number of anion A, m is 0 or positive number, and x satisfies the expression of $0.01 \leq x < 1$.

This complex hydroxide salt causes almost no occurrence of initial coloration when incorporated in halogen-containing resins because a part of lithium ion to enter a vacant site of aluminum hydroxide octahedron layer of the gibbsite structure in the lithium aluminum complex hydroxide salt is substituted for the metal ions of Mg and/or Zn. By substitution of a part of lithium ion for the divalent metal ions, the amount of charge-supplying anion is increased and the thermally stabilizing ability is superior to that of the lithium aluminum complex hydroxide salts.

16 Claims, 1 Drawing Sheet

LITHIUM, ALUMINUM, MAGNESIUM/ZINC HYDROXIDE SALT

TECHNICAL FIELD

The present invention relates to a novel complex metal hydroxide salt wherein metal consists of lithium, magnesium and/or zinc, and aluminum, a stabilizer for halogen-containing resin which comprises said complex metal hydroxide salt, a process for preparing the stabilizer and a halogen-containing resin composition which comprises said resin stabilizer.

BACKGROUND ART

It is well known that when halogen-containing resins such as a polyvinyl chloride resin and the like are subjected to a heat molding process, there occur troubles such as coloration and deterioration of the resins as well as corrosion formation in a molding machine by hydrochloric acid deriving from a heat decomposition reaction of dehydrochlorination. The heat decomposition of polyvinyl chloride resin is generally considered to be promoted by catalytic action of hydrogen chloride which generates in an early stage of decomposition. Therefore, it has been widely conducted to incorporate stabilizers for neutralizing and capturing hydrogen chloride in the early stage of decomposition.

As such a stabilizer, hydrotalcite represented by the formula $Mg_{(1-x)}Al_x(OH)_2A^{-n}{}_{x/n} \cdot mH_2O$ is known, and the use of the hydrotalcite is disclosed in Japanese Patent Unexamined Publication Nos. 80445/1980, 36012/1983 and 30737/1984.

Hydrotalcite where $Al(OH)_3$ forms a solid solution in $Mg(OH)_2$ consists of positively charged basic layers and interlayer consisting of an anion for neutralizing the positive charge and water of crystallization, and therefore it has some extent of thermal stability. The stabilizing action by the hydrotalcite is based on the neutralization and exchange of halogen with an anion, especially carbonate ion. However, the hydrotalcite has some defects. The anion content in the hydrotalcite is not sufficient to ensure high stability and it impairs transparency when incorporated into resin in large amount. For these reasons, compounds having more excellent stabilizing action have been required.

Japanese Patent Unexamined Publication No. 179052/1993 proposes a resin stabilizer comprising lithium aluminum complex hydroxide salt for solving the problem of the above-mentioned hydrotalcite.

Though the above-mentioned lithium aluminum complex hydroxide salt exhibits some extent of thermally stabilizing action for a halogen-containing polymer like the hydrotalcite, there is a problem that it makes the resin colored strongly owing to high content of an alkali metal (lithium) of an electron donor nature. Therefore, it can not be put into practical use.

DISCLOSURE OF THE INVENTION

As a result of having ardently studied for solving the above problem, the present inventors have succeeded in development of a stabilizer for a halogen-containing resin in which the alkali metal content is low and which causes almost no coloration by substituting a part of lithium ion to enter a vacant site of an aluminum hydroxide octahedron layer of the gibbsite structure for the divalent metals of Mg and/or Zn. Also, this resin stabilizer wherein a part of lithium ion is substituted for the divalent metal induces increase in the quantity of an anion to supply electron charge so that an ion exchange capacity with halogen become large thereby the thermally stabilizing action is markedly improved in comparison with the hydrotalcite and lithium aluminum complex hydroxide salt. In this case, the complex hydroxide salt where Zn ion is intercalated between the layers exhibits improved thermal stability effect in initial coloration.

According to the present invention, there is provided a stabilizer for a halogen-containing resin which is characterized by containing a complex hydroxide salt represented by the formula $[Al_2(Li_{(1-x)}M_x)(OH)_6]_n(A^{-n})_{1+x} \cdot mH_2O$ . . . Formula I wherein A is an inorganic or organic anion, M is Mg and/or Zn, n is a valence number of anion A, m is 0 or positive number, and x satisfies the expression $0.01 \leq x < 1$.

Thus, the complex hydroxide salt for use in the present invention is one wherein anion was introduced in larger amount into the interlayer than the prior art lithium aluminum complex hydroxide salt in order to neutralize a positive charge occurred by substituting for the divalent metal ions of magnesium and/or zinc a part of lithium ion to enter a vacant site of an aluminum hydroxide octahedron layer of the gibbsite structure in lithium aluminum complex hydroxide salt.

For example, FIG. 1 shows a X-ray diffraction pattern of carbonate type of lithium magnesium aluminum complex hydroxide for use in the present invention, and that of carbonate type of lithium aluminum complex hydroxide wherein no magnesium is introduced. Both the X-ray diffraction patterns are almost the same. The pattern of $Mg(OH)_2$ is not recognized in the pattern of lithium magnesium aluminum complex hydroxide salt. Moreover, the diffraction pattern of lithium magnesium aluminum complex hydroxide salt is shifted into somewhat lower angle side than that of lithium aluminum complex hydroxide salt. It is understood from this fact that $Mg(OH)_2$ forms solid solution in lithium magnesium aluminum complex hydroxide salt. Similarly, the diffraction pattern of lithium zinc aluminum complex hydroxide salt is also shifted to somewhat lower angle side, and it is understood that $Zn(OH)_2$ forms solid solution therein.

As an anion of the complex hydroxide salt which may be used in the present invention, carbonate ion, hydroxy acid ion of chlorine and hydroxy acid ion of phosphorous are preferred. As hydroxy acid, there may be selected one or more of perchloric acid, phosphoric acid, phosphorous acid, metaphosphoric acid and the like. Also, an anion may be acetic acid, propionic acid, adipic acid, benzoic acid, phthalic acid, terephthalic acid, maleic acid, fumaric acid, citric acid, tartaric acid, succinic acid, p-hydroxy-benzoic acid, salicylic acid, picric acid, sulfuric acid, nitric acid, iodine, fluorine, bromine and the like. Among these anions, especially perchloric acid intercalated complex hydroxide salt has an improved color preventing property in an initial coloration, coloration during processing, and color change with time. Also, the complex hydroxide perchlorate is an excellent stabilizer for two layer structure of an amino group-containing resin (such as urethane and the like) and polyvinyl chloride resin owing to its inhibitory action against the deterioration of polyvinyl chloride being promoted by amine which generates from urethane by thermal decomposition.

It is preferable that the complex hydroxide salt which may be used in the present invention is one which is fine particle having high dispersibility and relatively developed crystallite. For example, it has an average secondary particle size of preferably 3 μm or less, more preferably 1 μm or less and a BET specific surface area of preferably 50 m$^2$/g or less, more preferably 40 m$^2$/g or less.

The BET specific surface area can be measured by the conventional method in which nitrogen adsorption is carried out at the temperature of liquid nitrogen. The average secondary particle size can be determined by a method which comprises adding sample powder to an organic solvent such as ethanol or n-hexane, dispersing by ultrasonic, dropping the dispersion on a sample mount for a microscope, drying it and effecting a microscopic observation. Both an electron microscope and an optical microscope can be used in the microscopic observation.

First process for preparing a complex hydroxide salt represented by the above formula (I) comprises reacting a water soluble aluminum salt with a water soluble divalent metal salt where divalent metal is magnesium and/or zinc at a pH above 7, thereafter adding to the reaction mixture a water soluble lithium compound such as lithium carbonate or lithium hydroxide, and subjecting the resultant mixture to heat treatment.

More specifically, a water soluble aluminum compound, a divalent metal compound wherein metal is magnesium and/or zinc and an alkali are first reacted in an aqueous solution whose pH is kept at above 7, preferably about 8 to about 10, thereby producing an aluminum and the divalent metal complex hydroxide salt. As water soluble aluminum compounds, there may be used sodium aluminate, aluminum sulfate, aluminum chloride, aluminum nitrate, aluminum acetate and the like. As magnesium and/or zinc divalent metal compounds, there may be used salts of these metals and chloric acid, nitric acid, sulfuric acid or bicarbonic acid. As an alkali, hydroxide or bicarbonate of alkali metal, preferably bicarbonate may be used.

The aluminum and divalent metal complex co-precipitate obtained in the above reaction is washed with a suitable amount of water and subjected to heat treatment with addition of lithium carbonate or lithium hydroxide. The amount added of lithium carbonate or lithium hydroxide is recommended to be adjusted so that a molar ratio of $Li/Al_2O_3$ becomes 1-molar ratio of $M^{2+}O/Al_2O_3$ with respect to the content of $Al_2O_3$, $M^{+2}O$ in the aluminum and divalent metal complex co-precipitate. As to the temperature for heat treatment, a temperature ranging from an ordinary temperature to 200° C. is suitable. In the case where treatment temperature is low, a degree of crystallization is low. Accordingly, the reaction may be carried out preferably at a temperature above 90° C., more preferably 110° C. to 160° C. The reaction time may be 0.5 to 40 hours, preferably 3 to 15 hours.

Second process for preparing a complex hydroxide salt represented by the formula (I) comprises subjecting to heat treatment aluminum hydroxide, a water soluble lithium salt (such as lithium carbonate) and a water soluble compound containing divalent metal selected from magnesium and/or zinc in an aqueous solution.

For the purpose of preparing e.g. lithium, magnesium and aluminum complex hydroxide of carbonate type, the amount added of lithium carbonate and magnesium carbonate or basic magnesium carbonate is recommended to be adjusted so as to become [$Li/Al_2O_3$ (molar ratio)]+[$MgO/Al_2O_3$ (molar ratio)]=1 with respect to the content of $Al_2O_3$ in aluminum hydroxide. In this case, as lithium source a water soluble compound such as lithium hydroxide may be used. Also, as carbonic acid source, a carbonate such as sodium carbonate may be added for supplement.

As to the temperature for heat treatment, temperatures ranging from an ordinary temperature to 200° C. are suitable.

In the case that the treatment temperature is low, a degree of crystallization of the resultant complex hydroxide salt is low. Therefore, the reaction may be carried out at temperatures above 90° C., preferably 110° C. to 140° C. The reaction time is preferably 0.5 to 40 hours, more preferably 3 to 15 hours.

The thusly obtained complex hydroxide salt may be used as a raw material for preparing various kinds of complex hydroxide salts. For this purpose, an anion intercalated between layers may be ion-exchanged with other anion. For example, carbonic acid type of complex hydroxide salt is used as a raw material and a slurry of it in water is prepared. The predetermined amount of perchloric acid and/or its salt is added to the slurry to substitute carbonic acid for perchloric acid through an ion exchange, and the resultant mixture is evaporated to dryness or air-dried, thereby perchloric acid type of complex hydroxide salt may be easily obtained.

For kneading the complex hydroxide salt of the present invention into the plastics, it is preferable to use it after surface treatment with the conventional coating agents to increase the dispersion of it in the plastics. Examples of coating agents for use as the surface treatment include alkali metal salts of higher fatty acids such as sodium laurate, potassium laurate, sodium oleate, potassium oleate, sodium stearate, potassium stearate, sodium palmitate, potassium palmitate, sodium caprate, potassium caprate, sodium myristate, potassium myristate and potassium linoleate; higher fatty acids such as lauric acid, palmitic acid, oleic acid, stearic acid, capric acid, myristic acid and linoleic acid and phosphoric esters thereof; silane coupling agent, aluminum coupling agent, titanium coupling agent, zirconium coupling agent and the like.

The coating agent is added in an appropriate amount selected within the range of 0.1 to 10% by weight, preferably 0.5 to 6% by weight. The amount less than 1% by weight gives bad dispersibility. On the other hand, when the amount exceeds 10% by weight the protecting effect is sufficient, but is accompanied by economical disadvantage. The surface treatment by the coating agent may be easily conducted by either dry or wet method according to the conventional method.

Examples of the halogen-containing resin to be selected for use in the present invention include polyvinyl chloride, polyvinylidene chloride, chlorinated polyethylene, chlorinated polypropylene, chlorinated rubber, vinyl chloride-vinyl acetate copolymer, vinyl chloride-ethylene copolymer, vinyl chloride-propylene copolymer, vinyl chloride-styrene copolymer, vinyl chloride-isobutylene copolymer, vinyl chloride-vinylidene chloride copolymer, vinyl chloride-styrene-maleic anhydride terpolymer, vinyl chloride-styrene-acrylonitrile terpolymer, vinyl chloride-butadiene copolymer, vinyl chloride-propylene chloride copolymer, vinyl chloride-vinylidene chloride-vinyl acetate terpolymer, vinyl chloride-acrylic ester copolymer, vinyl chloride-maleic acid ester copolymer, vinyl chloride-methacrylic acid ester copolymer, vinyl chloride-acrylonitrile copolymer, polymer such as internally plasticized polyvinyl chloride, blends of these chlorine-containing polymers and polymers or copolymers of α-olefins such as polyethylene, polybutene, poly-3-methylbutene or ethylene-vinyl acetate copolymer, polyolefins such as ethylene-propylene copolymer, their copolymers, polystyrene, acrylic resin, styrene-other monomer copolymer, acrylonitrile-butadiene-styrene terpolymer, acrylic ester-butadiene-styrene terpolymer, methacrylic ester-butadiene-styrene terpolymer, chloroprene, chlorinated sulfonylpolyethylene, chlorinated butyl rubber, brominated butyl rubber, fluorinated rubber and the like.

When the complex hydroxide salt of the present invention is used as the stabilizer for halogen-containing resins, it is preferred to use 0.01 to 10 parts by weight of the complex hydroxide salt per 100 parts by weight of the resins as above-mentioned. In this case, in order to prevent the initial coloration of the halogen-containing resin it is desirable to use the complex hydroxide salt in conjunction with 0.01 to 10 parts by weight of zinc salt of an organic acid and 0.01 to 10 parts by weight of β-diketone and/or β-keto acid ester.

Examples of β-diketones to be selected include dehydroacetic acid, dehydropropionylacetic acid, dehydrobenzoylacetic acid, cyclohexane-1,3-dione, dimedone, 2,2'-methylene biscyclohexane-1,3-dione, 2-benzylcyclohexane-1,3-dione, acetyltetralone, palmitoyltetralone, stearoyltetralone, benzoyltetralone, 2-acetylcyclohexanone, 2-benzoylcyclo-hexanone, 2-acetyl-cyclohexanone-1,3-dione, benzoyl-p-chlorobenzoylmethane, bis(4-methylbenzoyl)methane, bis(2-hydroxybenzoyl)methane, benzoylacetylmethane, tribenzoylmethane, diacetylbenzoylmethane, stearoylbenzoylmethane, palmitoylbenzoylmethane, dibenzoylmethane, 4-methoxybenzoylbenzoylmethane, bis(4-chlorobenzoyl) methane, bis(3,4-methylene dioxybenzoyl)methane, benzoylacetyloctylmethane, benzoylacetylphenylmethane, stearoyl-4-methoxybenzoyl-methane, bis(4-tert-butylbenzoyl)methane, benzoyl-acetylethylmethane, benzoyltrifluoroacetylmethane, diacetylmethane, butanoylacetylmethane, heptanoylacetyl-methane, triacetylmethane, distearoylmethane, stearoyl-acetylmethane, palmitoylacetylmethane, lauroylacetylmethane, benzoylformylmethan, acetylformylmethylmethane, benzoyl-phenylacetylmethane, bis(cyclohexanoyl)methane and the like.

Also, salts of these β-diketone compounds with metal e.g. lithium, sodium, potassium, magnesium, calcium, barium, zinc, zirconium, tin, aluminum and the like may be used. Among these β-diketones, stearoylbenzoylmethane and dibenzoylmethane are especially preferred.

The stabilizer for halogen-containing resins comprising the complex hydroxide salt of the present invention may be used according to necessity in conjunction with various kinds of additives for use in plastic. Examples of such additives include organic acid metal salts, basic organic acid metal salts, perbasic organic acid metal salts, metal oxides, metal hydroxides, epoxy compounds, polyhydric alcohols, perhalogenate oxy acid salt, antioxidants such as phosphite, sulfur-containing antioxidants, phenolic antioxidants etc., ultraviolet absorbers, light stabilizers such as hindered amine, plasticizers, nucleus-forming agents, fillers and the like.

As metal resource in organic acid metal salts, basic organic acid metal salts and perbasic organic acid metal salts, there may be selected Li, Na, K, Ba, Mg, Sr, Zn, Cd, Sn, Cs, Al organotin and the like. Also, as examples of organic acids, carboxylic acids, organic phosphoric acids and phenols may be selected.

Examples of the carboxylic acids as above-mentioned include monocarboxylic acids such as acetic acid, propionic acid, butyric acid, valeric acid, caproic acid, enanthic acid, caprylic acid, neodecanoic acid, 2-ethylhexylic acid, pelargonic acid, capric acid, undecanoic acid, lauric acid, tridecanoic acid, myristic acid, palmitic acid, isostearic acid, stearic acid, 1,2-hydroxystearic acid, behenic acid, montanic acid, elaidic acid, oleic acid, linolic acid, linolenic acid, thioglycolic acid, mercaptopropionic acid, octylmercaptopropionic acid, benzoic acid, monochloro-benzoic acid, p-tert-butylbenzoic acid, dimethylhydroxy-benzoic acid, 3,5-di-tert-butyl-4-hydroxybenzoic acid, toluic acid, dimethylbenzoic acid, ethylbenzoic acid, cuminic acid, n-propylbenzoic acid, acetoxy-benzoic acid, salicylic acid, p-tert-octylsalicylic acid and the like; divalent carboxylic acids such as oxalic acid, malonic acid, succinic acid, glutaric acid, adipic acid, pimelic acid, suberic acid, azelaic acid, sebacic acid, maleic acid, fumaric acid, citraconic acid, mesaconic acid, itaconic acid, aconitic acid, thio-dipropionic acid, phthalic acid, isophthalic acid, terephthalic acid, hydoxyphthalic acid, chlorophthalic acid and the like, monoesters or monoamides of these divalent carboxylic acids; tri- or tetravalent carboxylic acids such as butanetricarboxylic acid, butanetetracarboxylic acid, hemimellitic acid, trimellitic acid, mellophanic acid, pyromellitic acid; di- or triesters of these trivalent or tetravalent carboxylic acids.

Examples of organic phosphoric acids to be selected include mono-or dioctylphosphoric acid, mono- or di-dodecylphosphoric acid, mono- or di(nonylphenyl) phosphoric acid, nonyl phenyl phosphonate, stearyl phosphonate and the like.

Examples of phenols to be selected include phenol, cresol, xylenol, methylpropylphenol, methyl tert-octyl phenol, ethylphenol, isopropylphenol, tert-butylphenol, n-butylphenol, diisobutylphenol, isoamylphenol, diamylphenol, isohexylphenol, octylphenol, isooctylphenol, 2-ethylhexylphenol, tert-octylphenol, nonylphenol, dinonylphenol, tert-nonylphenol, decylphenol, dodecylphenol, octadecylphenol, cyclohexylphenol, phenylphenol, thiophenol, dodecylphenol and the like.

The above organotin is incorporated as stabilizer in the resins. Examples of this organotin stabilizer to be selected include mono (or di) methyltin tri (or di) laurate, mono- (or di-) butyltin tri- (or di-) laurate, mono- (or di-) octyltin tri- (or di-) laurate and the like; mono- (or di-) alkyltin mateate such as polymer of mono (or di) methyltin maleate, polymer of mono- (or di-) butyltin maleate, mono (or di) methyltin tris (or bis) isooctyl maleate, mono- (or di) octyltin tris (or bis) isooctylmaleate and the like; mono- (or di-) alkylmercaptides such as mono- (or di-) methyltin tris (or bis) iso-octyl thioglycolate, mono (or di) octyltin tris (or bis) iso-octyl thioglycolate, mono (or di) butyltin tris (or bis) thioglycolate, mono (or di) methyltin thioglycolate (or 2-mercaptopropionate), mono- (or di-) butyltin thioglycolate (or 2-mercaptopropionate), mono- (or di-) octyltin thioglycolate (or 2-mercaptopropionate), mono- (or di-) methyltin tri- (or di-) dodecylmercaptide, mono- (or di-) butyltin tri- (or di-) dodecylmercaptide, mono- (or di- ) octyltin tri- (or di-) dodecylmercaptide, mono- (or di-) methyltinsulfide, dioctyltinsulfide, dodecyltinsulfide, mono (or di) methyl or butyl or octyltin tris (or bis) 2-mercaptoethyloleate, thiobis [monomethyltin bis(2-mercaptoethyloleate)], thiobis [dimethyl or dibutyl or dioctyltin mono (2-mercaptoethyl oleate)], mono- (or di-) octyltin-s,s'-bis(isooctylmercapto acetate).

Examples of epoxy compounds to be selected include epoxy soybean oil, epoxy linseed oil, epoxy fish oil, fatty acid ester of epoxy tall oil, epoxy beef tallow, epoxy caster oil, epoxy sunflower oil, butyl ester of epoxy linseed oil fatty acid, methyl epoxy stearate, butyl epoxy stearate, 2-ethylhexyl stearate or stearyl epoxy stearate, tris (epoxypropyl)isocyanurate, 3-(2-xenoxy)-1,2-epoxypropane, epoxydised polybutadiene, bisphenol A diglycidyl ether, vinyl cyclohexene diepoxide, dicyclopentadienediepoxide, 3,4-epoxycyclohexyl-6-methylepoxycyclohexane carboxylate and the like.

Examples of polyhydric alcohols to be selected include pentaerythritol, dipentaerythritol, sorbitol, mannitol, trimethylolpropane, ditrimethylolpropane, partial ester of pentaerythritol or dipentaerythritol and stearic acid, bis (dipentaerythritol)adipate, glycerin, diglycerin, tris(2-hydroxyester)isocyanurate and the like.

The halogenates oxy acid may be salts with metals such as Li, K, Na, Mg, Sr, Ca, Ba, Zn, Cd, Sn, Pb and the like, and with ammonia, organic amine compounds or organic quaternary ammonium compounds. Examples of halogenates oxy acid to be selected include perchlorate, periodate, perbromate, chlorate, bromate, chlorite, hypochlorite and bromous acid. They may be either anhydride or hydrate. Also, they may be ones dissolved in solvents such as alcohol or ones dissolved in alcohol and then dehydrated.

Examples of phenolic antioxidants to be selected include 2,6-di-tert-butyl-p-cresol, 2,6-diphenyl-4-octadecyloxylphenol, stearyl(3,5-di-tert-butyl-4-hydroxyphenyl) propionate, distearyl (3,5-di-tert-butyl-4-hydroxybenzyl) phosphate, thiodiethylene glycol bis [(3,5-di-tert-butyl-4-hydroxyphenyl)propionate], 1,6-hexamethylene bis [(3,5-di-tert-butyl-4-hydroxyphenyl) propionate], 1,6-hexamethylene bis [(3,5-di-tert-butyl-4-hydroxyphenyl) propionamide] 4,4'-thiobis(6-tert-butyl-m-cresol), 2,2'-methylene bis (4-methyl-6-tert-butylphenol), 2,2'-methylene bis(4-ethyl-6-tert-butylphenol), bis[3,3-bis (4-hydroxy-3-tert-butylphenyl)butyric acid]glycol ester, 4,4'-butylidene bis(6-tert-butyl-m-cresol), 2,2'-ethylidene bis(4,6-di-tert-butylphenol), 2,2'-ethylidene bis(4-sec-butyl-6-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl) isocyanurate, 1,3,5-tris(3,5-di-tert-butyl-4-hydroxybenzyl) iso-cyanurate, 1,3,5-tris(3,5-di-tert-butyl-4-hydroxybenzyl) -2,4,6-trimethylbenzene, 1,3,5-tris[(3,5-di-tert-butyl-4-hydroxyphenyl)propionyloxyethyl] isocyanurate, tetrakis [methylene-3-(3,5-di-tert-butyl-4-hydroxyphenyl) propionate]methane, 2-tert-butyl-4-methyl-6-(2-acryloyloxy-3-tert-butyl-5-methylbenzyl)phenol, 3,9-bis[1,1-dimethyl-2-[(3-tert-butyl-4-hydroxy-5-methylphenyl) propionyloxy]ethyl]-2,4,8,10-tetraoxaspiro[5,5]undecane, triethylene glycol bis[(3-tert-butyl-4-hydroxy-5-methylphenyl)propionate]and the like.

Examples of sulfur-containing antioxidants to be selected include dialkylthiodipropionate such as dilauryl, dimyristyl or distearyl ester of thiodipropionic acid; β-alkylmercaptopropionic acid ester of polyol such as tetra (β-dodecylmercaptopropionate) of pentaerythrytol.

Examples of phosphite antioxidants to be selected include tris (nonylphenyl) phosphite, tris(2,4-di-tert-butylphenyl) phosphite, tris [2-tert-butyl-4-(3-tert-butyl- 4-hydroxy-5-methylphenylthio)-5-methylphenyl]phosphite, tridecyl phosphite, octyl diphenyl phosphite, di(decyl) monophenyl phosphite, monodecyl diphenyl phosphite, mono (dinonylphenyl)bis(nonylphenyl)phosphite, di(tridecyl) pentaerythritol diphosphite, distearyl pentaerythritol diphosphite, di(nonylphenyl)pentaerythritol diphosphite, bis (2,4-di-tert-butylphenyl)pentaerythritol diphosphite, bis(2, 6-di-tert-butyl-4-methylphenyl)pentaerythritol diphosphite, tetra(tridecyl)isopropylidene-diphenyl diphosphite, tetra ($C_{12-16}$ mixed alkyl)-4,4'-n-butylidene bis(2-tert-butyl-5-methylphenol)diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphite, 2,2'-methylene bis(2,4-di-tert-butylphenyl) (octyl)phosphite and the like.

Examples of ultraviolet absorbers to be selected include 2-hydroxybenzophenone compounds such as 2,4-dihydroxylbenzophenone, 2-hydroxy-4-methoxybenzophenone, 2-hydroxy-4-octoxybenzophenone, 5,5'-methylene bis(2-hydroxy-4-methoxy)benzophenone and the like; 2-(2'-hydroxy-phenyl) benzotriazole compounds such as 2-(2'-hydroxy-5'-methylphenyl) benzotriaozole, 2-(2'-hydroxy-3',5'-di-tert-butylphenyl) benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3', 5'-dicumylphenyl)benzotriazole, 2,2'-methylenebis( 4-tert-octyl-6-benzotriazole)phenol and the like; phenylsalicylate, benzoates such as resorcinol monobenzoate, 2,4-di-tert-butyl-phenyl-3',5'-di-tert-butyl-4'-hydroxybenzoate, hexadecyl-3,5-di-tert-butyl-4-hydroxybenzoate and the like; substituted oxanilides such as 2-ethyl-2'-ethoxyoxanilide, 2-ethoxy-4'-dodecyloxanilide and the like; cyanoacrylates such as ethyl-α-cyano-β, β-diphenyl acrylate, methyl-2-cyano-3-methyl-3-(p-methoxyphenyl)acrylate and the like.

Examples of hindered amine light stabilizers to be selected include 2,2,6,6-tetramethyl-4-piperidylstearate, 1,2, 2,6,6-pentamethyl-4-piperidyl-stearate, 2,2,6,6-tetramethyl-4-piperidinylbenzoate, N-(2,2,6,6-tetramethyl-4-piperidyl) dodecyl succinic acid imide, 1-[(3,5-di-tert-butyl-4-hydroxyphenyl)propionyloxyethyl]-2,2,6,6-tetramethyl-4-piperidyl-(3,5-di-tert-butyl-4-hydroxyphenyl) propionate, bis(2,2,6,6-tetramethyl-4-piperidyl)sebacate, bis(1,2,2,6,6-pentamethyl-4-piperidyl)-2-butyl-2-(3,5-di-tert-butyl-4-hydroxybenzyl)maloate, N,N'-bis(2,2,6,6-tetramethyl-4-piperidyl)hexamethylene-diamine, tetra(2,2,6,6-tetramethyl-4-piperidinyl) butanetetra-carboxylate, tetra(1, 2,2,6,6-pentamethyl-4-piperidyl) di(tridecyl) butanetetracarboxylate, bis(2,2,6,6-tetramethyl-4-piperidyl) di(tridecyl) butanetetra-carboxylate, bis(1,2,2,6,6-pentamethyl-4-piperidyl-di(tridecyl)butanetetracarboxylate, 3,9-bis{1,1-dimethyl-2-[tris(2,2,6,6-tetramethyl-4-piperidyloxycarbonyloxy)butylcarbonyloxy]ethyl}- 2,4,8, 10-tetraoxaspiro[5,5]undecane, 3,9-bis{1,1-dimethyl-2-[tris (1,2, 2,6,6-pentamethyl-4-piperidinyloxycarbonyloxy) butylcarbonyloxy]ethyl}-2,4,8,10-tetraoxaspiro[5,5] undecane, 1,5,8,12-tetrakis{4,6-bis[N-(2,2,6,6-tetramethyl-4-piperidyl)butylamino]-1,3,5-triazine-2-yl}-1,5,8,12-tetrazadodecane, 1-(2-hydroxyethyl)-2,2,6,6-tetramethyl-4-piperidinol/succinic acid dimethyl ester condensate, 2-tert-octylamino-4,6-dichloro-s-triazine/N,N'-bis(2,2,6,6-tetramethyl-4-piperidyl)hexamethylenediamine condensate, N,N'-bis(2,2,6,6-tetramethyl-4-piperidyl) hexamethylene-diamine/dibromoethane condensate and the like.

Examples of plasticizers for plastics to be selected include phosphate plasticizers such as tributyl phosphate, triphenyl phosphate, tri(2-ethylhexyl)phosphate and the like; phthalic ester plasticizers such as dimethyl phthalate, dibutyl phthalate, dioctyl phthalate, diisodecyl phthalate and the like; aliphatic monobasic acid ester plasticizers such as butyl oleate, glycerol monooleate, butyl stearate, butyl epoxy stearate and the like; aliphatic dibasic acid ester plasticizers such as diisododecyl adipate, dibutyl adipate, di-2-ethylhexyl adipate and the like; divalent alcoholic ester plasticizers such as diethylene glycol dibenzoate and the like; hydroxy acid ester plasticizers such as methyl acetyl licinoleate and the like; chlorinated paraffin plasticizers; wax plasticizers such as wax, low molecular polystyrene, liquid paraffin and the like.

BEST MODES FOR CARRYING OUT THE INVENTION

Example 1

Figure 1:
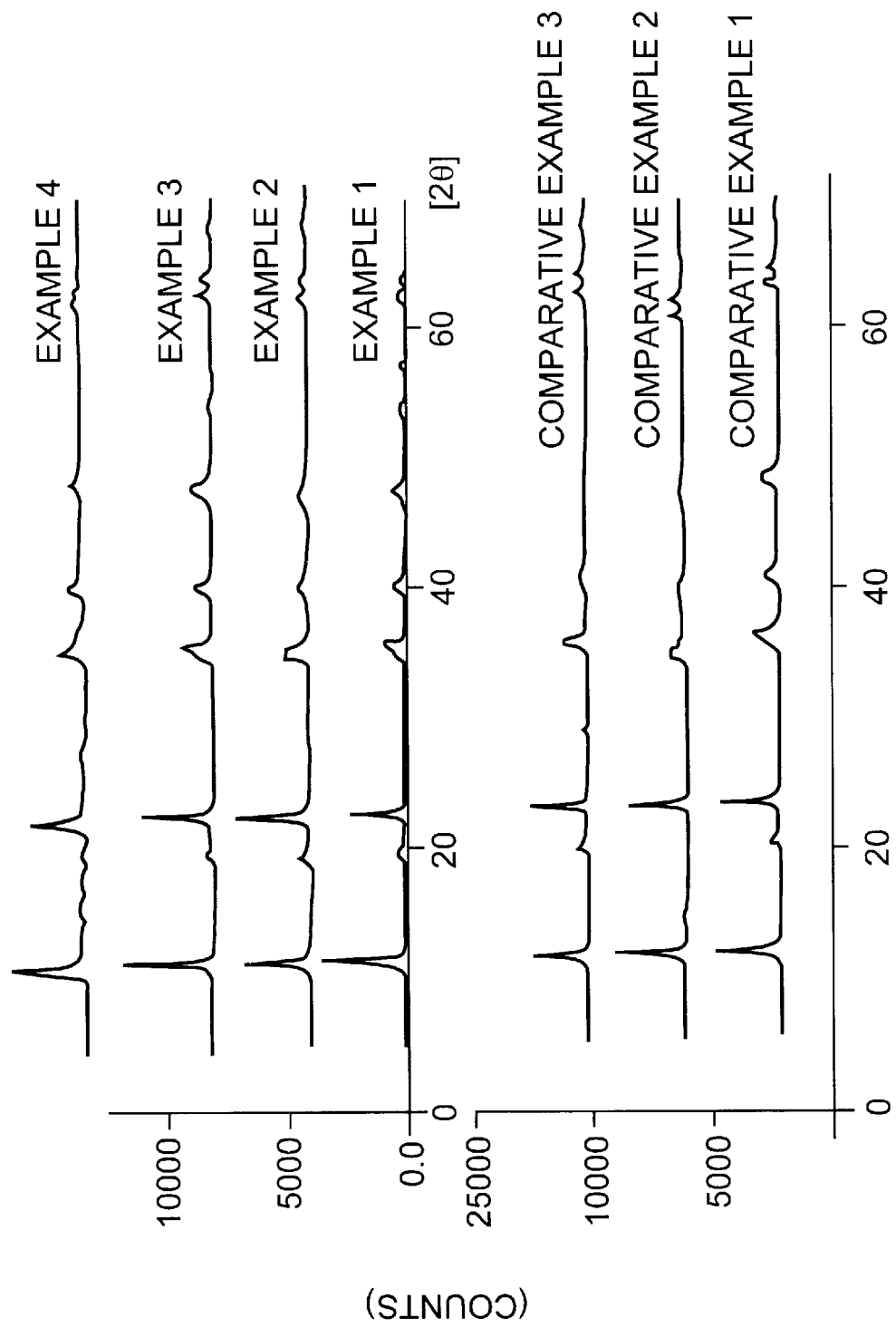
FIG. 1 is X-ray diffraction spectra of the respective powders obtained in Examples 1 to 4 and Comparative Examples 1 to 3.

Water was added to a mixed aqueous solution of 1638.2 g of aqueous aluminum sulfate solution containing 7.12% by weight of $Al_2O_3$ and 116.36 g of aqueous magnesium chloride solution containing 19.8% by weight of MgO to make 3 l of solution, which is designated as Solution A. Contrary thereto, water was added to a mixed solution of 465.12 g of aqueous solution containing 99.5% by weight of sodium carbonate and 462.28 g of aqueous sodium aluminate solution containing 18.69% weight of $Al_2O_3$ to make 10 l solution, which is designated as Solution B.

One liter of water was then added to a 2.5 l reaction vessel equipped with an overflow recovery function. While being sufficiently agitated with a stirrer, Solution A and Solution B were fed into the vessel through quantitative pumps at a rate of 123.5 ml/min and 370.5 ml/min, respectively to synthesize aluminum and magnesium complex hydroxide. The pH during the reaction was approximately 9. Three liters of the solution that overflowed from the vessel during the reaction was dehydrated to form a cake using a Buchner funnel under reduced pressure. The cake was then washed with a quantity of water equivalent to 150 times of the $Al_2O_3$ content in weight. After washing, water was added to the cake to make 3 l of homogeneous slurry of aluminum and magnesium complex hydroxide.

Thereafter, 11.79 g of lithium carbonate was added to the above slurry and the resultant slurry was subjected to heat treatment in 5 l of an autoclave at 140° C. for 16 hours. After the heat treatment, while the temperature of the slurry was kept to 90° C., 7.2 g of sodium stearate was added to carry out surface-treatment. The surface treated slurry was dehydrated to form a cake under reduced pressure with a Buchner funnel, and the cake was washed with a quantity of water equivalent to 40 times of the $Al_2O_3$ content in weight. After washing, the cake was dried overnight at approximately 110° C. The obtained white powders was subjected to chemical analysis, and it was determined that it had the following composition:

$$[Al_2(Li_{0.75} \cdot Mg_{0.25})(OH)_6]_2(CO_3)_{1.25} \cdot 2.12H_2O$$

Also, the BET specific surface area was measured on this powder, and it was found to be 37.1 m²/g.

EXAMPLE 2

To the slurry of aluminum and magnesium complex hydroxide obtained by Example 1, was added 13.25 g of lithium hydroxide, and the mixture was subjected to heat treatment in 5 l of an autoclave at 110° C. for 16 hours. After the heat treatment while the temperature of the slurry was kept to 90° C., 7.2 g of sodium stearate was added to carry out surface-treatment. The surface-treated slurry was dehydrated to form a cake under reduced pressure using a Buchner funnel, and the cake was then washed with a quantity of water equivalent to 40 times of the $Al_2O_3$ content in weight. After washing, the cake was dried overnight at approximately 110° C. The obtained white powders were subjected to chemical analysis, and it was determined that it had the following composition:

$$[Al_2(Li_{0.78} \cdot Mg_{0.22})(OH)_6]_2(CO_3)_{1.22} \cdot 2.24H_2O$$

Also, the BET specific surface area was measured on this powder, and it was found to be 31.1 m²/g.

EXAMPLE 3

Water was added to 86.9 g of aqueous aluminum hydroxide solution containing 65.25% by weight of $Al_2O_3$ to make 3.5 l of homogeneous slurry. To this slurry were added 18.68 g of lithium carbonate and 5.24 g of aqueous basic magnesium carbonate solution containing 42.76% by weight of MgO, and the resultant slurry was subjected to heat treatment in 5 l of an autoclave at 110° C. for 16 hours. After the heat treatment, while the temperature of the slurry was kept to 90° C., 7.2 g of sodium stearate was added for surface-treatment. And, the surface-treated slurry was dehydrated to form a cake under reduced pressure using a Buchner funnel, and the cake was then washed with a quantity of water equivalent to 40 times of the $Al_2O_3$ content in weight.

After washing, the cake was dried overnight at approximately 110° C. The obtained white powders were subjected to chemical analysis, and it was determined that it had the following composition:

$$[Al_2(Li_{0.89} \cdot Mg_{0.11})(OH)_6]_2(CO_3)_{1.11} \cdot 1.98H_2O$$

Also, the BET specific surface area was measured on this powder, and it was found to be 17.9 m²/g.

EXAMPLE 4

40.9 Grams of $ZnCl_2$ was dissolved in 1417 g of aqueous aluminum sulfate solution containing 7.20% by weight of $Al_2O_3$ to form a solution, which is designated as Solution C. Contrary thereto, a NaOH solution having a concentration of 3 mol/l is designated as Solution D.

Next, Solution C and Solution D were reacted at a pH of 9.0~9.5 with a similar vessel having overflow recovery function as in Example 1. The reaction mixture was filtered, washed and followed by addition of water in the similar manner as in Example 1 to obtain homogeneous slurry of aluminum and zinc complex hydroxide.

Thereafter, to this slurry were added 36.9 g of lithium carbonate and 53 g of $Na_2CO_3$, and the resultant slurry was subjected to heat treatment in 5 l of an autoclave at 120° C. for 15 hours. After the heat treatment, while the slurry temperature was kept to 90° C., 7.2 g of sodium stearate was added for surface-treatment. The slurry after the surface-treatment was dehydrated to form a cake under reduced pressure using a Buchner funnel, and the cake was washed with a quantity of water equivalent to 40 times of the $Al_2O_3$ content in weight. After washing, the cake was dried overnight at 110° C.

The obtained white powders were subjected to chemical analysis, and it was determined that it had the following composition:

$$[Al_2(Li_{0.72} \cdot Zn_{0.28})(OH)_6]_2(CO_3)_{1.28} \cdot 2.2H_2O$$

Also, the BET specific surface area was measured on this powder, and it was found to be 23.2 m²/g.

EXAMPLE 5

The complex hydroxide of carbonic acid type having the composition of $[Al_2(Li_{0.75} \cdot Mg_{0.25})(OH)_6]_2(CO_3)_{1.25} \cdot 2.12H_2O$ which was obtained by Example 1 was suspended in water to prepare a 10% slurry. While the slurry was vigorously stirred, 2500 g of 5% perchloric acid solution was added. The resultant slurry was spray-dried.

The obtained white powders had the composition of $$[Al_2(Li_{0.75} \cdot Mg_{0.25})(OH)_6]_2(CO_3)_{0.25}(ClO_4)_{1.00} \cdot 2.0H_2O$$

Also, the BET specific surface area of this powder was 18.5 m²/g.

EXAMPLE 6

The complex hydroxide obtained by Example 1 was dried at 200° C. so that water content becomes 3 parts by weight.

Comparative Example 1

Water was added to 1638.2 g of aqueous aluminum sulfate solution containing 7.12% by weight of $Al_2O_3$ to make 3 l of solution, which is designated as Solution E. Contrary thereto, water was added to a mixed aqueous solution of 467.9 g of 99.5% by weight of sodium carbonate solution and 462.28 g of sodium aluminate solution containing 18.69% by weight of $Al_2O_3$ to make 10 l of solution, which is designated as Solution F.

One l of water was then added to a 2.5 l of reaction vessel equipped with a overflow recovery function. While agitation was sufficiently operated with a stirrer, Solution E and Solution F were respectively fed thereto at rate of 123.5 ml/min and 370.5 ml/min using quantitative pumps. The pH during the reaction was approximately 9. Three l of the reaction solution which was overflowed from the reaction vessel through the reaction was dehydrated to form a cake under reduced pressure using a Buchner funnel. Thereafter, the cake was washed with a quantity of water equivalent to 150 times the $Al_2O_3$ content in weight. After washing, to the cake was added water to make 3 l of homogeneous slurry in the total quantity.

12.76 g of lithium carbonate was then added to the above slurry and the mixture was subjected to heat treatment in a 5 l autoclave at 110° C. for 16 hours. After the heat treatment, while the slurry temperature was kept to 90° C., 7.2 g of sodium stearate was added for surface-treatment. The surface-treated slurry was dehydrated to form a cake under reduced pressure using a Buchner funnel, and then the cake was dried overnight at approximately 110° C. The obtained white powders were subjected to chemical analysis, and it was determined that it had the following composition:

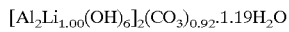

$[Al_2Li_{1.00}(OH)_6]_2(CO_3)_{0.92} \cdot 1.19H_2O$

Also, the BET specific surface area was measured on this powder, and it was found to be 44.5 m²/g. (Evaluation of thermal stability)

To confirm the thermal stability effect on a polyvinyl chloride resin by the stabilizer for halogen-containing resin in the present invention, polyvinyl chloride resin sheet and polypropylene resin sheet were prepared in accordance with the following formulation and molding method and subjected to the evaluation test.

Experiment 1

As the evaluation samples, the products obtained by Examples 1 to 5 and Comparative Example 1 were used. Furthermore, Comparative Examples 2 and 3 were also added. As sample for Comparative Example 2 a commercial thermal stabilizer composed of hydrotalcite "Alcamizer-1" (a trade name, a product of Kyowa Chemical Industry Co., Ltd.) was used. As sample for Comparative Example 3, a commercial thermal stabilizer composed of lithium aluminum complex hydroxide salt "Mizucalac" (a trade name, a product of Mizusawa Industrial Chemicals, Ltd.) was used.

| Formulation | |
|---|---|
| Polyvinyl chloride resin (degree of polymerization: 1050) | 100 parts |
| Zinc stearate | 0.2 part |
| Dibenzoylmethane | 0.2 part |
| Sample | 1.0 part |

Molding method

The above formulated composition was kneaded by a roll mill at 165° C.~170° C. for 3 minutes to prepare a uniform hard polyvinyl chloride sheet having a thickness of 1 mm.

Test method (1) Initial coloration

The sample sheet prepared by roll milling was heated at 190° C. under pressure of 300 kg/cm² for 1 minute to form a hard polyvinyl chloride resin sheet having a thickness of 4 mm. And, degree of coloration was determined visually, thereby degree of initial coloration was compared. The obtained are shown in Table 1 wherein the mark "⊚", "○" and "Δ" indicate colorless, slight yellow, yellow, respectively.

(2) Thermal stability duration time

The sample sheet obtained by the roll mill kneading was suspended in a Geer's oven adjusted to 190° C., and was taken out every 10 minutes. The degree of coloration was visually evaluated. The time which elapsed before it changed to black color was measured. The obtained results are shown in Table 2 wherein the marks "A", "B", "C", "D" and "E" indicate colorless, slight yellow, pale brown, brown, black, respectively.

It can be understood from the results shown in Table 2 that the stabilizer for halogen-containing resin which comprises lithium magnesium aluminum complex hydroxide salt of the present invention exerts excellent thermal stabilizing effect.

TABLE 1

| Example | | | Comparative Example | | |
|---|---|---|---|---|---|
| 1 | 2 | 3 | 1 | 2 | 3 |
| ○ | ○ | ○ | Δ | ○ | Δ |

TABLE 2

| | Example | | | Comparative Example | | |
|---|---|---|---|---|---|---|
| Time | 1 | 2 | 3 | 1 | 2 | 3 |
| 0 min | A | A | A | B | A | B |
| 10 min | B | B | B | B | B | B |
| 20 min | B | B | B | B | B | B |
| 30 min | B | B | B | B | D | B |
| 40 min | B | B | B | C | E | B |
| 50 min | C | C | C | E | | D |
| 60 min | C | D | D | | | E |
| 70 min | E | E | E | | | |

Experiment 2

Each of the compounds obtained in Examples 1 and 4 was used as the sample for evaluation and the thermal stability test was conducted with respect to the following formulation.

| Formulation | |
|---|---|
| Polyvinyl chloride resin (degree of polymerization: 1050) | 100 parts |
| Calcium stearate | 0.2 part |
| Dibenzoylmethane | 0.2 part |
| Sample | 1.0 part |

The molding and the thermal stability testing methods were conducted according the same method as in Experiment 1. The results are shown in Tables 3 and 4 wherein evaluation standards are the same as those in Experiment 1.

TABLE 3

| | Example | |
|---|---|---|
| | 1 | 4 |
| | ○ | ◎ |

TABLE 4

| | Example | |
|---|---|---|
| Time | 1 | 4 |
| 0 min | B | A |
| 10 min | B | B |
| 20 min | C | B |
| 30 min | C | C |
| 40 min | D | C |
| 50 min | D | E |
| 60 min | D | |
| 70 min | D | |

Experiment 3

To evaluate the effect of the stabilizer of the present invention used in combination with organotin stabilizers, thermal stability test was conducted with respect to the test specimen prepared from Formulations 1 to 3 shown below. The molding and the thermal stability testing methods were conducted in the same manner as in Experiment 1.

| Formulation 1 | |
|---|---|
| Polyvinyl chloride resin (degree of polymerization: 800) | 100 parts |
| Example 6 | 1.0 part |
| Monobutyltin mercaptide | 1.0 part |
| Montanic acid ester | 0.4 part |
| Glycerin ricinoleate | 0.8 part |
| Formulation 2 | |
| Polyvinyl chloride resin (degree of polymerization: 800) | 100 parts |
| Monobutyltin mercaptide | 2.0 parts |
| Montanic acid ester | 0.4 part |
| Grycerol resinoleate | 0.8 part |
| Formulation 3 | |
| Polyvinyl chloride resin (degree of polymerization: 800) | 100 parts |
| Example 6 | 2 parts |
| Montanic acid ester | 0.4 part |
| Glycerol ricinoleate | 0.8 part |

Experiment 4

Using lithium magnesium aluminum complex hydroxide salt prepared in Example 1 and dipentaerythritol (DPE), Formulations 4 and 5 shown below were prepared. The test specimen was prepared therefrom according to the similar molding method as in Experiment 1 and subjected to the thermal stability test in the same manner as Experiment 1.

| Formulation 4 | |
|---|---|
| Polyvinyl chloride resin (degree of polymerization: 800) | 100 parts |
| Example 1 | 0.5 part |
| DPE | 0.5 part |
| Zinc stearate | 0.2 part |
| Formulation 5 | |
| Polyvinyl chloride resin (degree of polymerization: 800) | 100 parts |
| Example 1 | 0.5 part |
| Zinc stearate | 0.2 part |
| Dibenzoylmethane | 0.2 part |

Table 5 shows the results of the thermal stability test carried out with respect to the test specimen of Experiments 3 to 5. The evaluation standards are the same as those in Experiment 1.

TABLE 5

| | Formulation | | | | |
|---|---|---|---|---|---|
| Time | 1 | 2 | 3 | 4 | 5 |
| 0 min | A | A | A | B | A |
| 10 min | A | A | B | B | A |
| 20 min | A | A | D | C | B |
| 30 min | A | B | D | C | B |
| 40 min | B | B | D | C | D |
| 50 min | B | C | D | D | D |
| 60 min | B | C | E | D | D |
| 70 min | C | D | | D | D |
| 80 min | C | E | | D | D |

Experiment 5

To examine the compatibility of the stabilizer of the present invention with various resin additives, the following formulated compositions were kneaded by a roll mill under the same condition as Experiment 1 and subjected to thermal stability test in the same manner as in Experiment 1.

| Formulation 6 | |
|---|---|
| Polyvinyl chloride resin (degree of polymerization: 1050) | 100 parts |
| Dioctyl phthalate (DOP) | 50 parts |
| DBM | 0.2 part |
| Zinc stearate | 0.2 part |
| Formulation 7 | |
| Polyvinyl chloride resin (degree of polymerization: 800) | 100 parts |
| Example 1 | 1 part |
| Zinc stearate | 0.5 part |
| Calcium stearate | 1 part |
| Formulation 8 | |
| Polyvinyl chloride resin (degree of polymerization: 800) | 100 parts |
| Zinc stearate | 0.5 part |
| Calcium stearate | 1 part |
| Formulation 9 | |
| Polyvinyl chloride resin (degree of polymerization: 800) | 100 parts |

-continued

| | |
|---|---|
| Zinc stearate | 0.5 part |
| Barium stearate | 1 part |

Formulation 11

| | |
|---|---|
| Polyvinyl chloride resin (degree of polymerization: 1050) | 100 parts |
| Example 1 | 1 part |
| Bisphenol A | 0.2 part |
| Zinc stearate | 0.3 part |
| DOP | 40 parts |
| Epoxy soybean oil | 3 parts |

Formulation 12

| | |
|---|---|
| Polyvinyl chloride resin (degree of polymerization: 800) | 100 parts |
| Example 1 | 1 part |
| Calcium carbonate | 5 parts |
| Dibenzoylmethane (DBM) | 0.2 part |
| DOP | 40 parts |
| Zinc stearate | 0.2 part |

Formulation 13

| | |
|---|---|
| Polyvinyl chloride resin (degree of polymerization: 1050) | 100 parts |
| DOP | 40 parts |
| DBM | 0.1 part |
| Zinc stearate | 0.3 part |
| Alkyl aryl phosphite (a trade name "Adkstab PEP-36") | 0.5 part |
| Example 3 | 1 part |

Formulation 14

| | |
|---|---|
| Polyvinyl chloride resin (degree of polymerization: 1050) | 100 parts |
| HALS (a trade name "Sanol S-770") | 0.2 part |
| DOP | 20 parts |
| DBM | 0.2 part |
| Zinc stearate | 0.2 part |
| Example 2 | 1 part |
| Epoxy soyabean oil | 2 parts |

Formulation 15

| | |
|---|---|
| Polyvinyl chloride resin (degree of polymorization: 800) | 100 parts |
| Example 2 | 1 part |
| DBM | 0.2 part |
| Zinc stearate | 0.2 part |
| Epoxy soybean oil | 2 parts |
| Ultra violet absorber (a trade name "TINUVIN 571") | 0.3 part |

Formulation 16

| | |
|---|---|
| Chlorinated polyvinyl chloride resin | 100 parts |
| Example 1 | 1 part |
| Monobutyltin mercaptide | 0.5 part |
| Dibutylbutyltin mercaptide | 0.5 part |
| "SL-02" (a product of Riken Vitamin Co., Ltd.) | 0.5 part |

Formulation 17

| | |
|---|---|
| Polyvinyl chloride resin (degree of polymerization: 800) | 100 parts |
| Chlorinated polystyrene | 20 parts |
| Example 1 | 3 part |
| SL-02 | 0.5 part |
| Zinc stearate | 0.2 part |
| DBM | 0.2 part |

Table 6 shows the results of the thermal stability test carried out with respect to the test specimen prepared from the above-mentioned Formulations 6 to 17. The evaluation standards in Table 6 are the same as those in Experiment 1.

TABLE 6

| Time | Formulation | | | | | | | | | | | |
|---|---|---|---|---|---|---|---|---|---|---|---|---|
| | 6 | 7 | 8 | 9 | 10 | 11 | 12 | 13 | 14 | 15 | 16 | 17 |
| 0 min | A | B | B | B | B | B | B | A | A | A | A | B |
| 10 min | A | B | B | B | B | B | B | A | A | B | A | B |
| 20 min | B | C | C | C | C | C | B | B | B | B | B | B |
| 30 min | B | C | C | C | E | C | B | B | B | B | B | C |
| 40 min | B | C | D | C | | C | C | B | B | B | B | C |
| 50 min | B | C | | D | | C | C | B | B | D | B | C |
| 60 min | B | C | | E | | D | E | B | B | E | B | C |
| 70 min | D | D | | | | D | | C | C | | C | E |
| 80 min | E | E | | | | E | | C | D | | C | |

Experiment 6

To observe the yellowing preventing effect of polypropylene resin containing halogen containing catalyst residue, the following formulated composition was prepared.

| | |
|---|---|
| Polypropylene resin containing halogen - containing catalyst residues | 100 parts |
| Example 1 | 0.05 part |
| Bisphenol A | 0.1 part |
| SL-02 | 0.3 part |

The above formulated composition was pelletized at 210° C. using an extruder, and then shaped into a film having a thickness of 150 cm with a brabender at 220° C. The film was placed in a constant-temperature constant humidity tank and allowed to stand at 90° C. and a relative humidity of 90% for 20 days. Thereafter, the yellowing resistance test was carried out by a color computor "MODEL TC-1500MC-88" (a trade name, a product of Tokyo Demshoku Co., Ltd.). Comparison test under the similar manner was conducted using lithium aluminum complex hydroxide salt prepared by Comparative Example 1. The results are shown in Table 7.

TABLE 7

| | Yellowing resistance test (N value) |
|---|---|
| Example 1 | 5.0 |
| Comparative Example 1 | 5.8 |

Industrial Applicability

Since the stabilizer for halogen-containing resin in the present invention comprises lithium, divalent metals of magnesium and/or zinc and aluminum complex hydroxide salt, it exerts excellent thermal stabilizing effect. This stabilizer improves initial coloration which is a fault of lithium aluminum complex hydroxide salt and exhibits superior effect to lithium aluminum complex hydroxide salt and hydrotalcites in the thermal stability duration time. By the process for preparing a stabilizer for halogen-containing resin according to the present invention, this complex hydroxide salt may be simply and conveniently prepared well.

Since the halogen-containing resin composition of the present invention comprises lithium, magnesium and/or zinc, and aluminum complex hydroxide salt, it undergoes almost no initial coloration and has excellent thermal stability.

We claim:

1. A complex hydroxide salt represented by the formula $$[Al_2(Li_{(1-x)} \cdot M_x)(OH)_6]_n(A^{-n})_{1+x} \cdot mH_2O$$

wherein A is an inorganic or organic anion, M is Mg and/or Zn, n is a valence number of an anion A, m is 0 or positive number and x satisfies the expression $0.01 \leq x < 1$.

2. A stabilizer composition for halogen-containing resin comprising the complex hydroxide salt of claim 1.

3. A stabilizer for halogen-containing resin as claimed in claim 2 wherein A is at least one of anions selected from the group consisting of carbon ion, hydroxy acid ion of chlorine and hydroxy acid ion of phosphorous.

4. A stabilizer for halogen-containing resin as claimed in claim 2 wherein said complex hydroxide salt is coated with about 0.1 to 10% by weight of at least one of coating agents selected from the group consisting of fatty acid, fatty acid salt, phosphoric ester and coupling agent.

5. A process for preparing the stabilizer for halogen-containing resin of claim 2 which comprises reacting a water soluble aluminum compound with a water soluble compound containing Mg and/or Zn ions in an aqueous solution whose pH is kept at 7 or more, adding lithium slat thereto and heating the resultant mixture at a temperature of about 100° C. or more.

6. A process for preparing the stabilizer for halogen-containing resin of claim 2 which comprises reacting aluminum hydroxide, water soluble lithium compound and water soluble magnesium and/or zinc compounds in water medium at a temperature of about 100° C. or more.

7. A halogen-containing resin composition which comprises 0.01 to 10 parts by weight of the stabilizer for halogen-containing resin defined in claim 2 per 100 parts by weight of the halogen-containing resin.

8. A halogen-containing resin composition which comprises 0.01 to 10 parts of the stabilizer for halogen-containing resin as defined in claim 2, 0.01 to 10 parts of zinc salt of an organic acid and 0.01 to 10 parts by weight of β-diketone and/or β-keto acid ester per 100 parts by weight of the halogen-containing resin.

9. A halogen-containing resin composition which comprises 0.01 to 10 parts by weight of the stabilizer for halogen-containing resin as defined in claim 2 and 0.01 to 10 parts by weight of an organotin stabilizer per 100 parts by weight of the halogen-containing resin.

10. A halogen-containing resin composition which comprises 0.01 to 10 parts by weight of the stabilizer for halogen-containing resin as defined in claim 2 and 0.01 to 10 parts by weight of polyol and/or polyol partial ester per 100 parts by weight of the halogen-containing resin.

11. A halogen-containing resin composition which comprises 0.01 to 10 parts by weight of the stabilizer for halogen-containing resin as defined in claim 2, 0.01 to 10 parts by weight of zinc salt of an organic acid, 0.01 to 10 parts by weight of β-diketone and/or β-keto acid ester and 0.01 to 10 parts by weight of polyol and/or polyol partial ester per 100 parts by weight of the halogen-containing resin.

12. A halogen-containing resin composition which comprises 0.01 to 10 parts by weight of the stabilizer for halogen-containing resin defined in claim 4 per 100 parts by weight of the halogen-containing resin.

13. A halogen-containing resin composition which comprises 0.01 to 10 parts by weight of the stabilizer for halogen-containing resin defined in claim 4, 0.01 to 10 parts of zinc salt of an organic acid and 0.01 to 10 parts by weight of β-diketone and/or β-keto acid ester per 100 parts by weight of the halogen-containing resin.

14. A halogen-containing resin composition which comprises 0.01 to 10 parts by weight of the stabilizer for halogen-containing resin defined in claim 4, and 0.01 to 10 parts by weight of an organotin stabilizer per 100 parts by weight of the halogen-containing resin.

15. A halogen-containing resin composition which comprises 0.01 to 10 parts by weight of the stabilizer for halogen-containing resin defined in claim 4 and 0.01 to 10 parts by weight of polyol and/or polyol partial ester per 100 parts by weight of the halogen-containing resin.

16. A halogen-containing resin composition which comprises 0.01 to 10 parts by weight of the stabilizer for halogen-containing resin defined in claim 4, 0.01 to 10 parts by weight of zinc salt of an organic acid, 0.01 to 10 parts by weight of β-diketone and/or β-keto acid ester and 0.01 to 10 parts by weight of polyol and/or polyol partial ester per 100 parts by weight of the halogen-containing resin.

* * * * *